United States Patent [19]

Giardina et al.

[11] Patent Number: 4,878,341
[45] Date of Patent: Nov. 7, 1989

[54] BOOM AND GRAPPLE CONFIGURATION FOR LOADING WHOLESTALK CUT SUGAR CANE AND METHOD OF OPERATION

[75] Inventors: Jacob Giardina; Kenneth Rodrigue, both of Thibodaux, La.

[73] Assignee: Cameco Industries, Inc., Thibodaux, La.

[21] Appl. No.: 326,535

[22] Filed: Mar. 21, 1989

[51] Int. Cl.[4] ............................................. A01D 91/04
[52] U.S. Cl. .................................. 56/364; 56/DIG. 2
[58] Field of Search ............................... 56/13.5–13.9, 56/14.3, 1, DIG. 2, 192, 364

[56] References Cited

U.S. PATENT DOCUMENTS

| | | | |
|---|---|---|---|
| 2,669,829 | 2/1954 | Pugh | 56/192 |
| 2,809,487 | 10/1957 | Oyama | 56/364 |
| 3,090,183 | 5/1963 | Thomson | 56/1 |
| 3,448,564 | 6/1969 | Chauffe | 56/14.3 |
| 3,475,886 | 11/1969 | Hart | 56/DIG. 2 X |
| 4,380,281 | 4/1983 | Duncan | 56/14.3 X |
| 4,609,318 | 9/1986 | Rodrigue et al. | 56/16.1 X |

OTHER PUBLICATIONS

CAMECO SP 1800-Four—Wheel-Drive Self Propelled Can Loader Brochure, Nov., 1987.
CAMECO R-6 Continuous Loader Brochure.

Primary Examiner—Thuy M. Bui
Attorney, Agent, or Firm—Pravel, Gambrell, Hewitt, Kimball & Krieger

[57] ABSTRACT

A wholestalk sugar cane loader apparatus is provided for the picking up and accumulating of windrowed wholestalk sugar cane from a cane field ground surface using a boom and grapple configuration that skews the grapple jaw travel path with respect to the longitudinal axis of the boom. This configuration allows use of a shorter boom and a shorter travel path. This configuration also allows greater spacing between the loader and the cane cart to improve cane quality by eliminating both cane rollover and the muddying of the cane which typically occurs by splashing of tires because of the close proximity of the cane loader and the cane cart.

11 Claims, 6 Drawing Sheets

BOOM AND GRAPPLE CONFIGURATION FOR LOADING WHOLESTALK CUT SUGAR CANE AND METHOD OF OPERATION

BACKGROUND OF THE INVENTION

1. Field of the Invention

The present invention relates to sugar cane harvesting, and more particularly relates to an improved boom and grapple configuration for use with sugar cane loaders wherein the boom axis and grapple jaw closure path axis are skewed at an acute angle with respect to each other so that the loader and a cane cart can be maintained side by side during loading, spaced a row apart to improve cane quality by eliminating cane muddying or damaging because of mud splashing or rollover. In the method of operation, cane wholestalks are lifted upwardly with the boom and grapple from an initial position on the ground surface of a sugar cane field, and the boom travels a short approximate ninety degree (90°) arc to discharge the cane wholestalks at a second elevated position where the cane falls into a cart. The improved configuration allows the cane cart and its hauling tractor to remain one row away from the cane heap being loaded, eliminating the possibility of rolling on the cane or of mud being splashed upon the cane heap row, resulting in a cleaner cane product at the mill.

2. General Background

In the harvesting of sugar cane, each stalk of cane is typically cut at the bottom and at the top, creating a cut "wholestalk", and then wholestalks are piled into "windrows" wherein the cane is piled normal to and atop two adjacent rows, spanning a furrow. In the hand harvesting of sugar cane, each stalk is cut at the bottom and at the top, and some of the time once or twice in the center portion of the stalk. These large sections of cane are still referred to as "wholestalks". Cane wholestalks are piled generally parallel to one another, each stalk extending across the raised soil rows of the cane field, straddling the rows where the cane was initially standing and growing.

Several devices have been patented which describe the mechanical methods and apparatus used to harvest cane and to place it in "windrows", which are stacks of cane perpendicular to the rows. The Duncan U.S. Pat. No. 4,380,281 for example entitled "Associated Running Gear and Piler Improvement in a Two Row Harvester and Piler" relates to a sugar cane harvester which cuts the cane at its top and bottom and thus produces wholestalks. A wholestalk as used herein refers to a stalk of cane which is cut at its base near the ground, and at its top to remove leaves, but which has not been cut into several smaller pieces or "billets". Wholestalk harvesters such as the harvester shown in the Duncan '281 patent cut and then pile the cane in generally parallel fashion, perpendicular to the rows. These harvesters are also known as "soldier" harvesters because the cut cane is maintained in a vertical position, one stalk following the previous stalk (like marching soldiers) often being cut and prior to piling. A cane loader which addresses the problem of accumulating cane wholestalks into bundles is disclosed in U.S. Pat. No. 4,609,318 entitled "Rotary Piler System For Sugar Cane".

U.S. Pat. No. 3,475,886 entitled "Method of Harvesting Sugar Cane" shows a harvester which uses a constant discharge of cut cane to the left hand side of the harvester.

Other examples of cane harvesting and piling equipment include the Pugh U.S. Pat. No. 2,669,829 entitled "Cane Harvesting and Piling Machine" the Thompson U.S. Pat. No. 3,090,183 "Process for Harvesting and Piling Cane", and U.S. Pat. No. 3,448,564 entitled "Cane Harvester". These cane harvester patents are exemplary of various machines that can be used to cut and pile cane and are exemplary of cane harvesting equipment in general. Hand cut cane, also referred to as "wholestalk" cane is handled in the same basic way.

When wholestalk cane has been windrowed, it must then be lifted and placed into cane carts or trucks for delivery to the sugar cane mill. Several devices are now commercially available which are used to gather and load the cane. These gathering devices are typically referred to as "cane loaders". One of the most common types of loaders is simply a wheeled device which carries a movable boom having a grapple formed by opposed grabbing tines mounted at the end of the boom. The tines are usually hydraulically powered and operate much like a crab claw to grab large batches or bundles of the cane. The closed tines are lifted by the boom to transfer the gathered cane up into the air and deposit it into large cane carts or trucks.

One of the problems with cane gathering devices is the problem of the unintentional mixing of mud, dirt and rocks with the cane which produces a reduction in sugar extraction, higher processing costs and an expensive cleaning problem at the mill. Water must be used to clean the cane of mud. This muddy water becomes a potential source of water pollution. Thus there is a need for an efficient "clean" cane loader. Because of the proximity of the cane loader to the cart (usually pulled by a tractor), the cane stalks can be muddied by the simple splashing of mud. Sometimes the tractor/trailer rolls over the cane stalk ends causing damage and/or extensive muddying of the cane.

Several cane loaders are commercially available. One commercial embodiment of a four wheel drive, self propelled cane loader is the Cameco SP 1800 model loader manufactured by the assignee of the present invention, Cameco Industries, Inc. The Cameco SP 1800 is a hydrostatic drive, self propelled cane loader with an articulated boom mounted on the frame of the loader. The boom includes a forward end portion with a pair of spaced apart powered tines which are hydraulically actuated to open and close. The tines are fixed so that the travel path of the tines is aligned with the boom axis. In another version of the SP 1800, the tines are rotatably mounted with respect to the end of the boom.

A commercially available continuous loader is the Cameco model R-6 which uses endless inclined chains mounted upon sprockets for lifting the cane stalks from the ground. After the cane is picked up by the chains it is cut into billets. Two blowers and two extractors remove leaves and dirt that was attached to the cane.

Some commercially available loaders use a forwardly inclined scoop in combination with gathering chains to the cane stalks from the ground surface. The scoop includes a forwardly curved section which redirects the cane forwardly so that continuous operation of the device tends to roll the cane into an ever increasing bundle which constantly communicates with the scoop. Thus the cane never leaves the scoop until it is ready for loading.

SUMMARY OF THE PRESENT INVENTION

The present invention provides a wholestalk sugar cane loading apparatus for accumulating and lifting windrowed wholestalks from a cane field ground surface. The apparatus includes a preferably powered carriage, and a forward end for engaging and accumulating the wholestalks cut cane into a heap. An elongated boom is rotatably mounted upon the carriage at a rotary connection. The boom extends away from the rotary connection along a radial line defining a boom longitudinal axis. A pair of opposed jaws are attached to the distal end of the boom defining a grapple, the jaws being moveable with respect to each other along a jaw travel path. This improved configuration allows the boom to make a shorter arc of about ninety degrees (90°) yet automatically orients the tines in proper position to grab and to unload the cane without having to use a grapple with an additional rotating device.

The jaw travel path and the boom longitudinal axis are preset "skewed", being fixed to intersect each other and define an acute angle therebetween. During operation, the boom pivots to a firt pick-up position, placing the grapple to the left of the carriage centerline. Because the grapple jaws and boom are at a preset skew angle, this boom position aligns the jaw travel path with the longitudinally extending heap row and at right angles to the cane wholestalks.

In a second discharge position, the boom is moved to the right side of the carriage longitudinal center axis and places the jaw travel path at generally right angles with respect to the carriage longitudinal center axis. The boom now forms an acute angle with the carriage travel path moving through a short arc of about ninety degrees (90°) from the "pick-up" to the "discharge" position.

The carriage has a longitudinal central axis and the boom's rotary connection is offset laterally from the carriage longitudinal axis. The acute angle between the boom and jaw travel path places the jaw travel path parallel to the carriage longitudinal axis when the boom rotates the jaws to the first "pick-up" position, left of the carriage centerline. In this position the boom defines an acute angle with the carriage longitudinal axis. In the second discharge position, the boom moves to the right of the carriage centerline, forming an acute angle therewith, and the jaw travel path is generally perpendicular to the carriage centerline.

The cane stalks are normally piled after being cut, perpendicular to the rows. The grapple tines in the pick up position maintain this parallel positioning of the cane wholestalks with respect to one another and during transfer of the cane stalks from the cane field ground surface to the discharge position.

In the method of the present invention, an improved method is provided for gathering and loading cut cane wholestalks into a cane cart or truck for transport to the mill, wherein a full row of space is maintained between the cane cart wheels and the cane, and a loader boom with a short ninety degree (90°) arc transfers the cane between its windrowed position in the field, and the cane cart. The wholestalks have typically been windrowed by a harvester earlier and are laying on the ground field surface in an initial resting position generally perpendicular to the rows.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
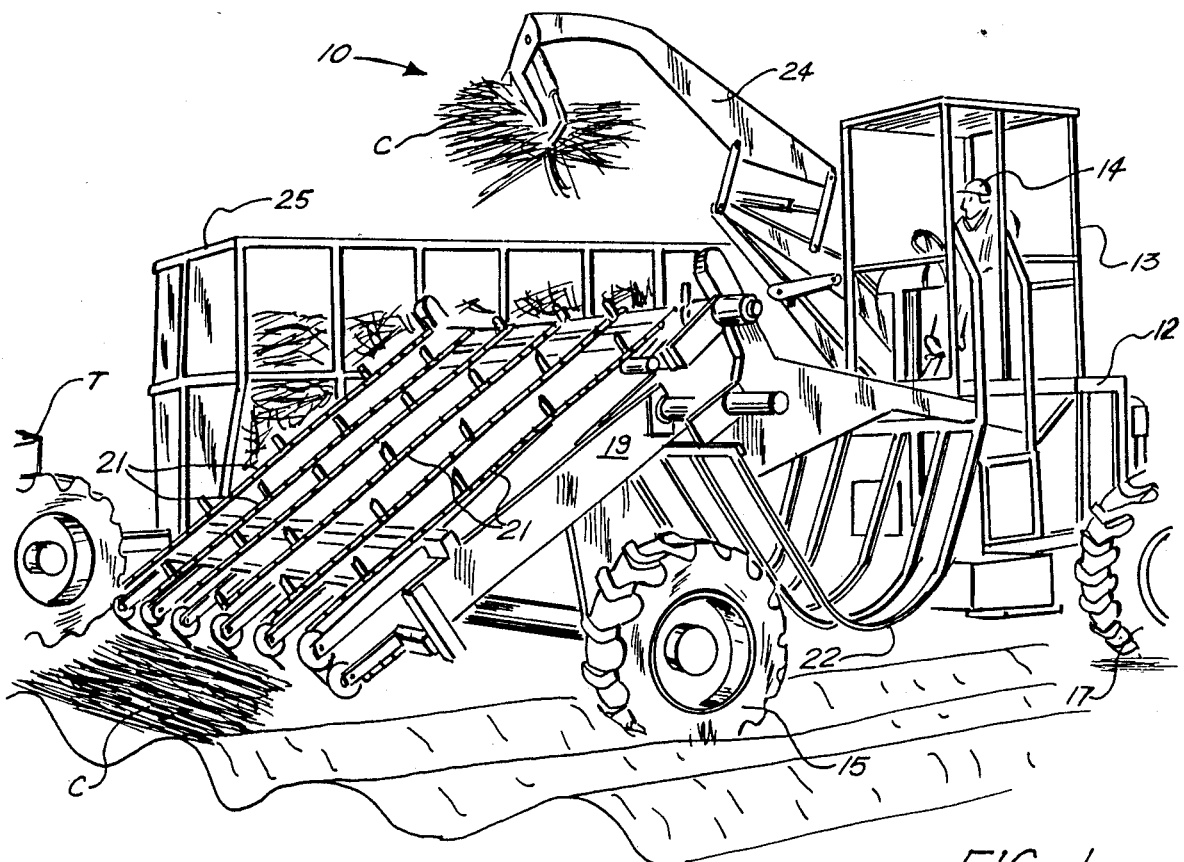
FIG. 1 is a perspective view of the preferred embodiment of the apparatus of the apparatus of the present invention.
Figure 2:
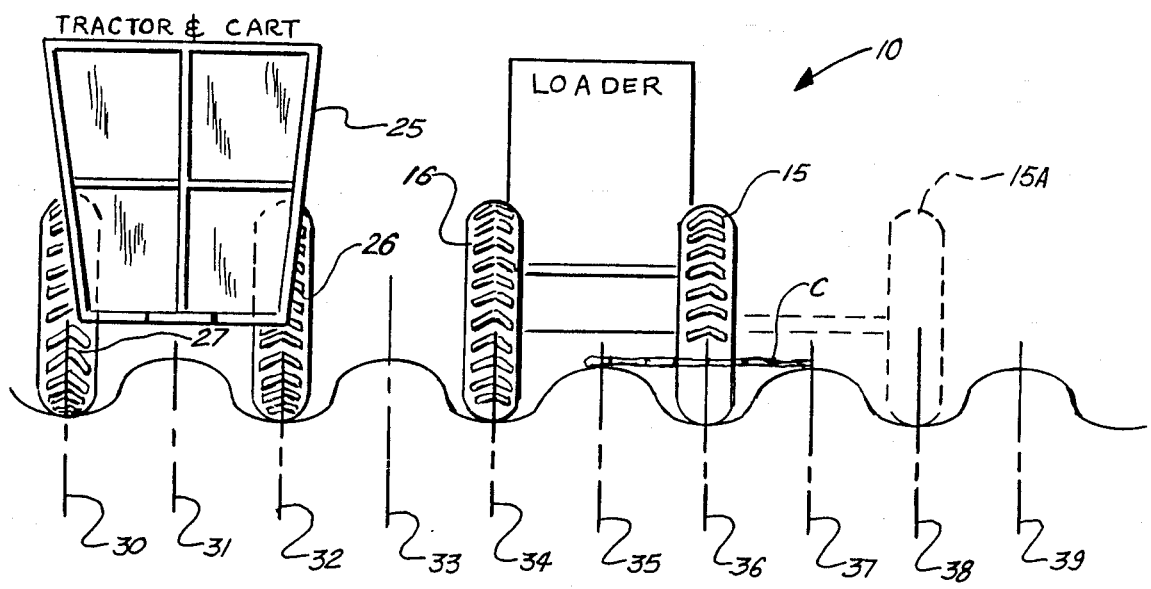
FIG. 2 is an elevational schematic view illustrating the method of the present invention.
Figure 3:
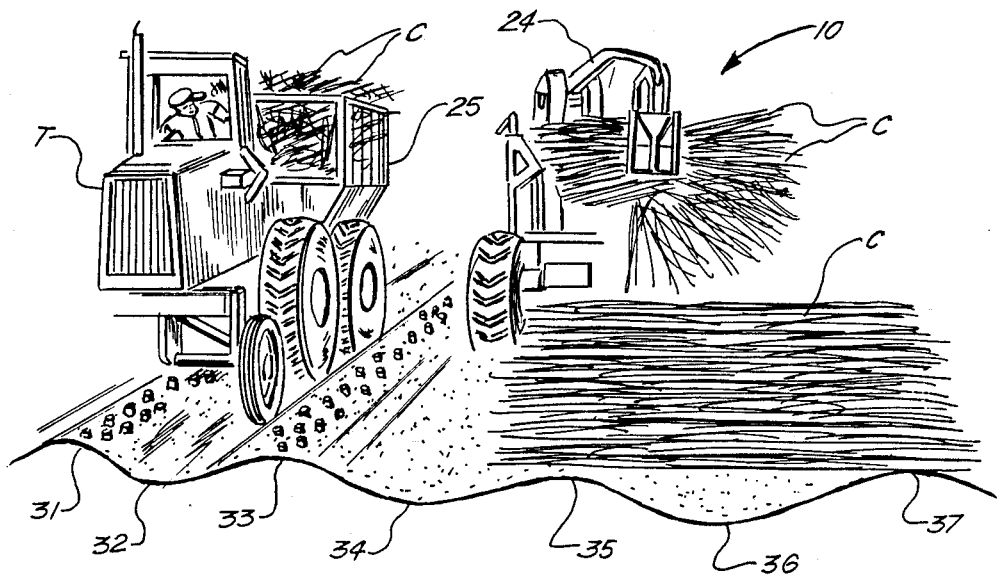
FIGS. 3 and 4 are perspective views of the preferred embodiment of the apparatus of the present invention, and illustrating the method of the present invention.
Figure 4:
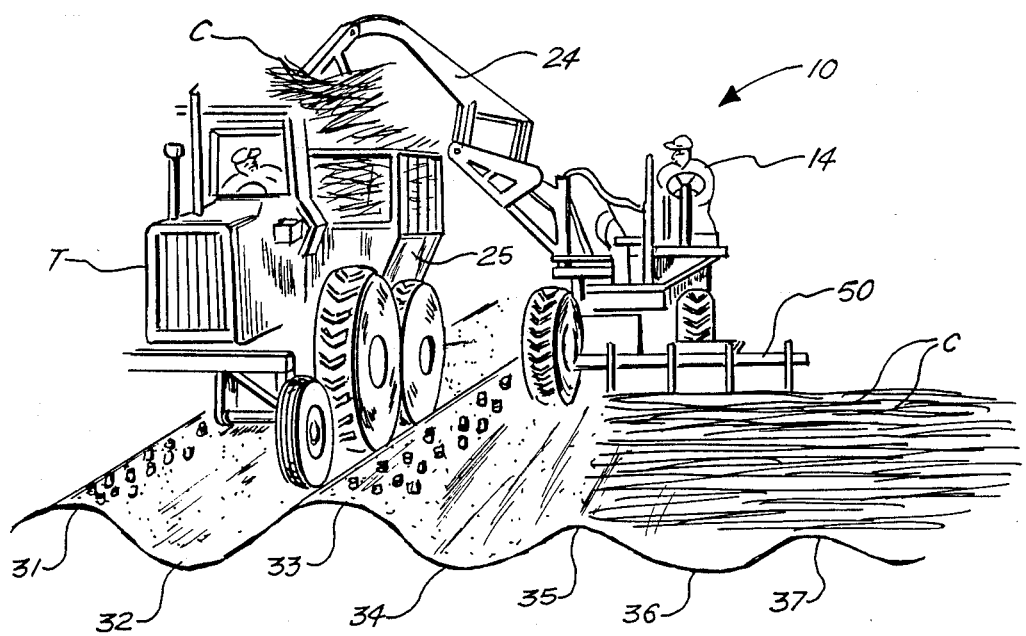
Figure 5:
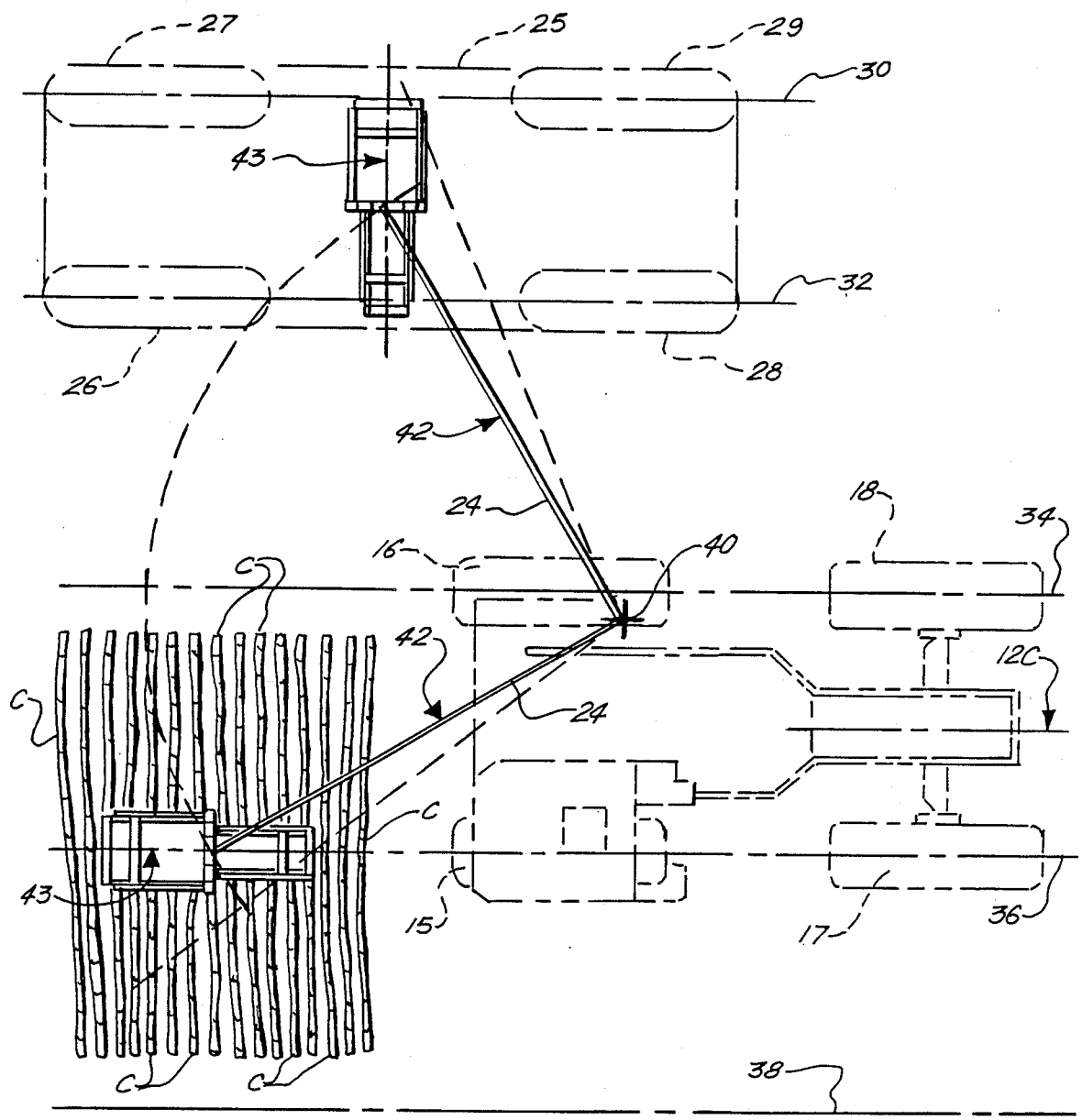
FIG. 5 is a plan schematic view illustrating the preferred embodiment of the present invention for a single row axle loader.
Figure 6:
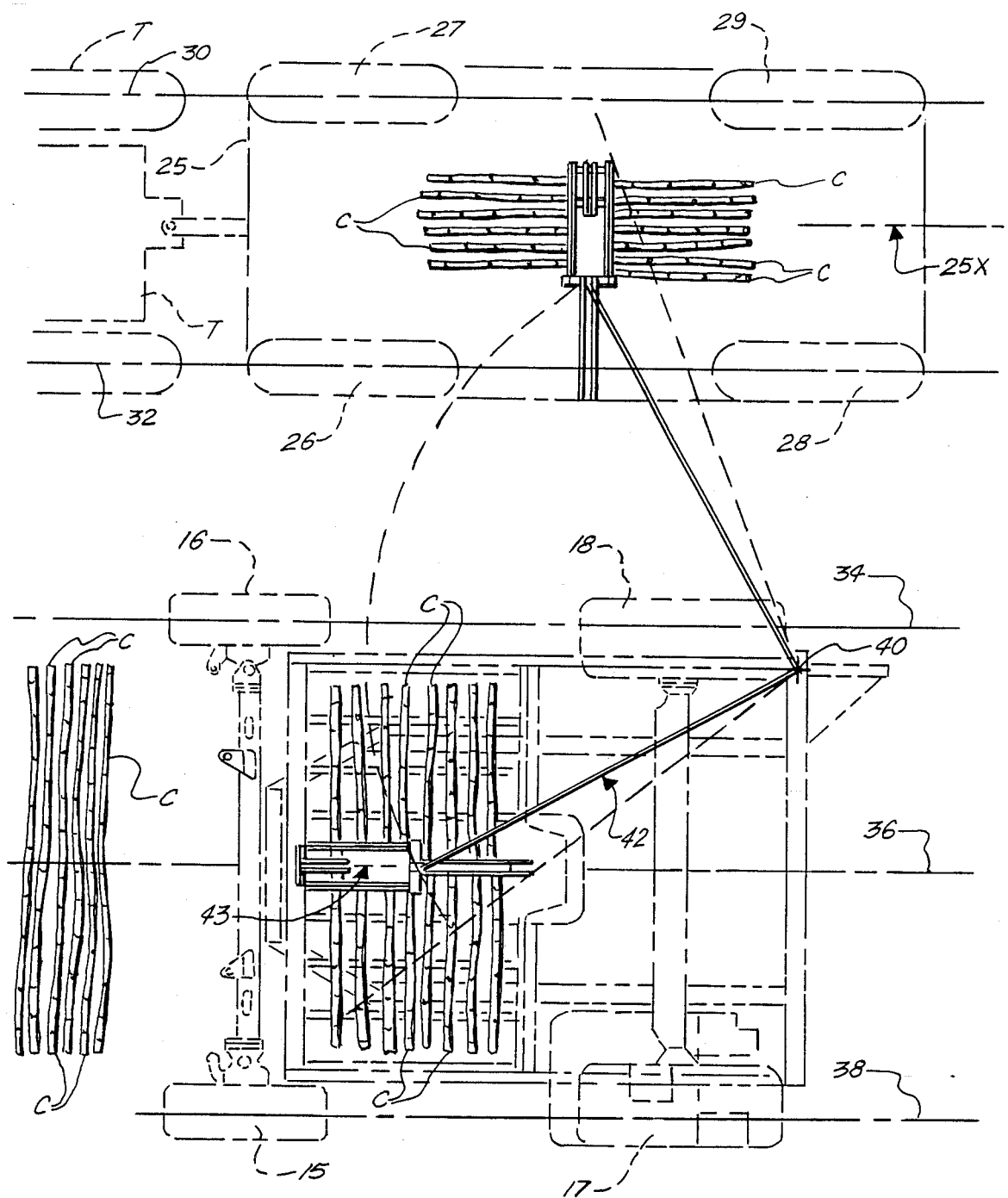
FIG. 6 is a top plan schematic view of the preferred embodiment of the apparatus of the present invention illustrating a two row axle loader.

FIGS. 1–9 illustrate the preferred embodiment of the apparatus of the present invention designated generally by the numeral 10. Cane loader 10 can be in the form of a one row axle loader (FIGS. 3–5 and 7, 9) or in the form of a two row axle loader with a chain pick up and holding basket (FIGS. 1 and 6). In FIG. 2, a schematic illustration shows positioning of a one row axle (hard lines) and a two row axle (one wheel 15A in phantom lines) loader 10 with respect to the wheels of a cane cart 25 that is used to carry a large volume of cane to the mill for grinding and processing. A plurality of rows and furrows are shown, designated as 30–39. Notice that a row 33 is maintained as a space between loader 10 and cart 25. This is important, because it prevents rollover damage by the cart 25 of cane wholestalks C being picked up by loader 10. Additionally, mud which is splashed by the wheels of cane cart 25 will not muddy the cane stalks C as easily with this improved configuration and method. This improved positioning and method is possible because of the improved loader boom and grapple configuration of the present invention as will now be described more fully.

Figure 10:
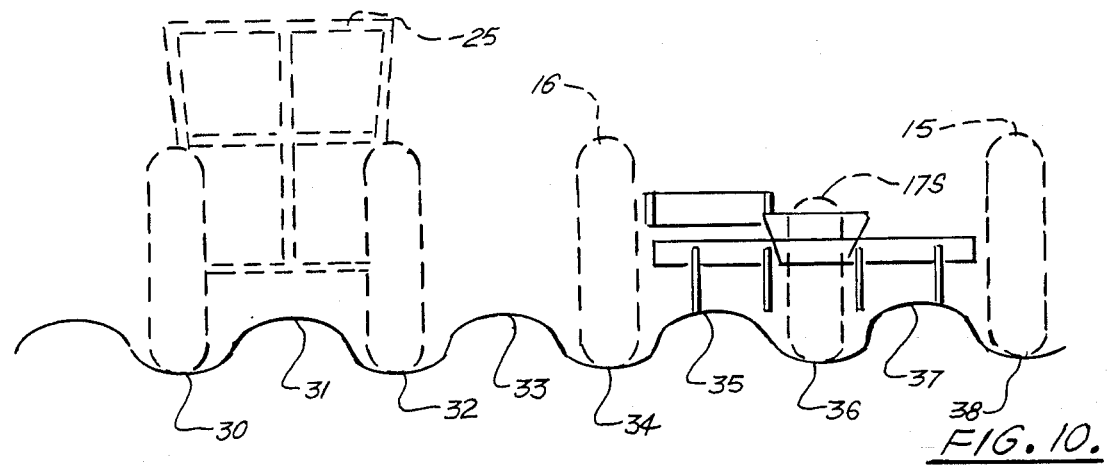
FIG. 10 is a front elevational schematic view of another embodiment using a three wheel loader frame.
Figure 11:
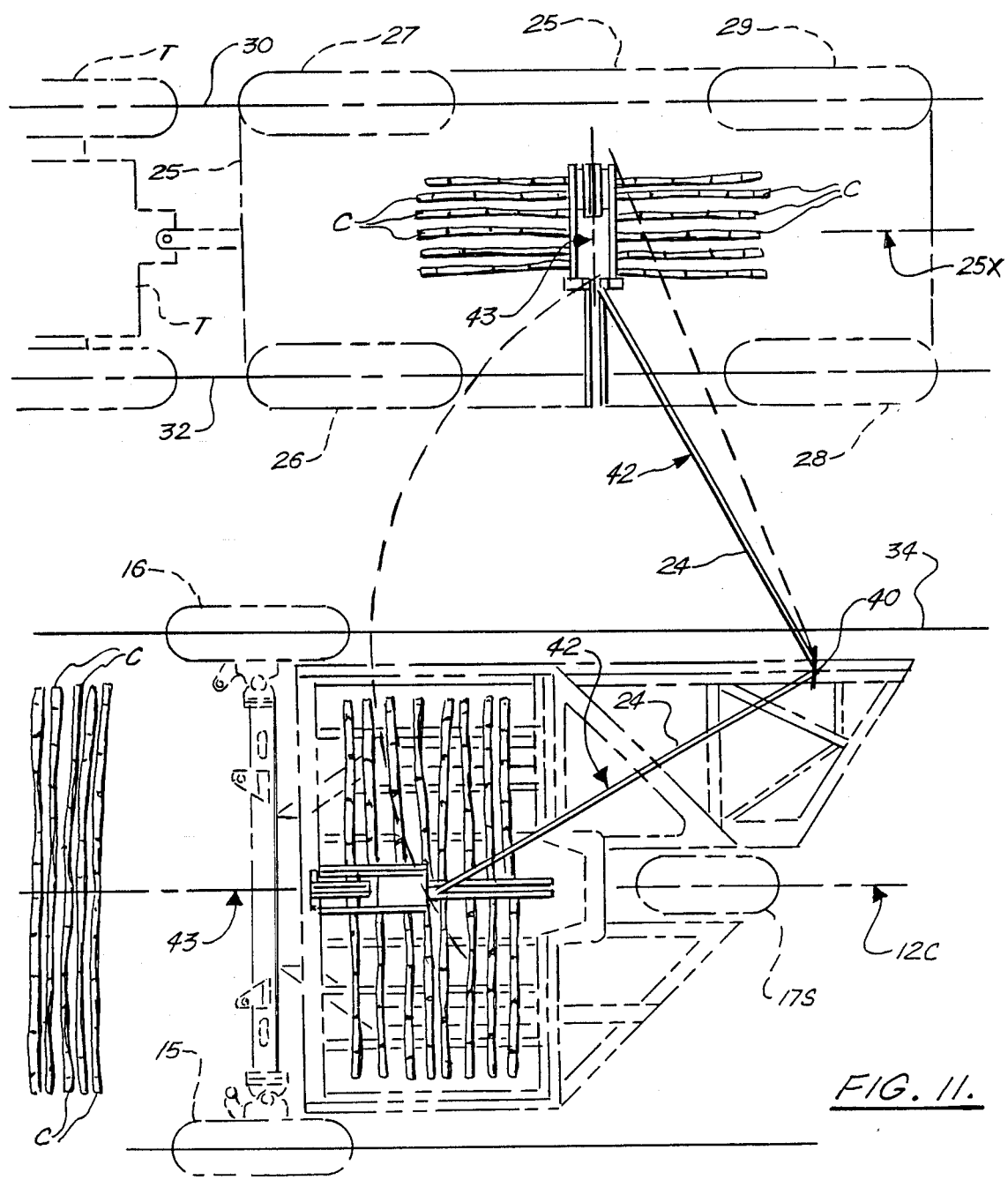
FIG. 11 is a plan view of the loader of FIG. 10.

Loader 10 includes a frame 12 having a canopy or a cabin 13 thereon for protectively housing an operator 14. The frame 12 is wheeled, providing a plurality of large wheels with tires including preferably front wheels 15, 16 which are respective front left and right wheels, and rear wheels 17, 18 which are respective left 17 and right 18 rear wheels. In the single axle wide embodiment of FIGS. 3–5 and 9, forwardly facing tines 51-54 help accummulate the cut cane stalks C into a bundle. Tines 51-54 are mounted upon transverse bumper 50 which is anchored firmly for support to frame 11. A three wheeled loader frame could be employed, typically having two larger front wheels 15, 16 and a smaller usually powered steered rear wheel 17S (FIGS. 10-11).

In a two row axle loader a chain type pickup 19 for example, can be used to gather a plurality of cane wholestalks C. The chain type pickup 19 can include a plurality of endless chains 21 which lift the cane from the ground surface upwardly and into a basket 22. The particular construction of the chain type pickup 19 and basket 22 can be seen in co-pending prior patent application Ser. No. 194,807, filed on May 17, 1988 and naming Cameco Industries, Inc., as assignee.

An elongated boom 24 is pivotally mounted upon the frame 12 so that the boom can rotate with respect to the frame 12 and with respect to the underlying earth. The boom 24 is used to load wholestalk cane C into a cane cart 25 or the like so that the cart can transport a large number of canestalks to the mill for processing. The cane cart is typically a wheeled construction having front 26, 27, and rear 28, 29 wheels. Typically the cane cart is not powered but is pulled by means of a tractor T for example.

In FIG. 2, the spacial relationship of various rows and furrows 30-39 is shown with respect to the wheels of the cane cart 25 and the loader 10. It should be understood, that the tractor T and cane cart 25 have wheels which occupy the same furrows 30, 32 during operation as can be seen by inspection of FIGS. 2, 3, and 4.

The furows include even numbered designations in FIG. 2 namely 30, 32, 34, 36, and 38. The raised/planted rows include odd numbered designations in FIG. 2 namely 31, 33, 35, 37, and 39. One of the advantages of the present invention is that the tractor and cart T, 25 have wheels which travel one row away from the heap of canestalks C being loaded, eliminating the possibility of rolling on the wholestalk cane C or mud being splashed onto the heap row with the canestalks C. This spacing of the hauling tractor T and cane cart 25 with respect to the loader 10 can best be seen in FIGS. 2, and 3-6.

Boom 24 includes a boom end portion 41. The boom end portions supports a grapple arrangement as will be described more fully hereinafter. The boom is elongated and substantially linear in a radial direction away from the pivot 40 as can best be seen in FIGS. 5 and 6, with the boom longitudinal axis 42 being designated in those Figures.

Figure 7:
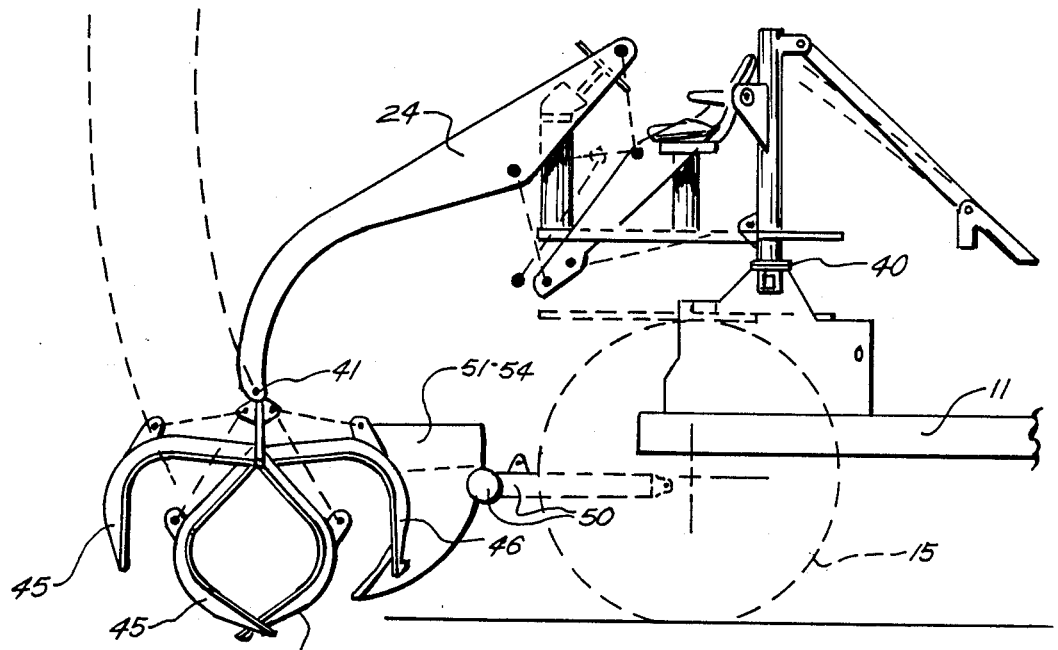
FIG. 7 is a fragmentary side elevational view of the preferred embodiment of the apparatus of the present invention illustrating a single row axle loader.
Figure 8:
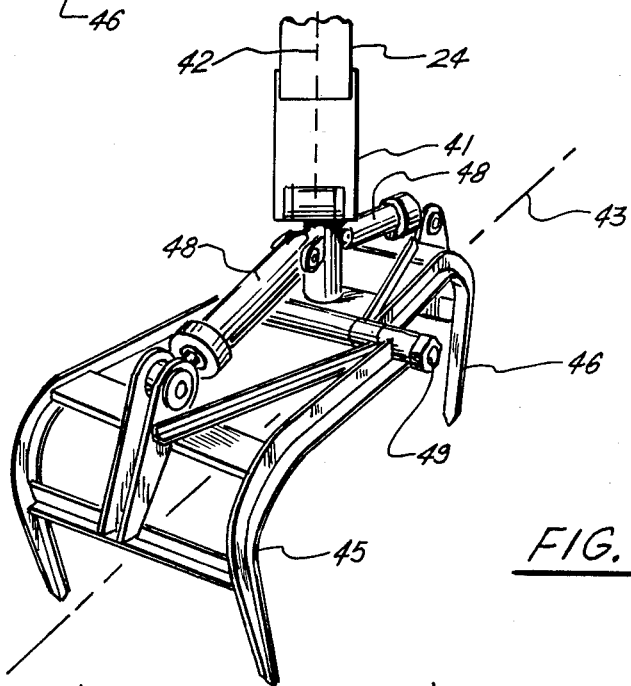
FIG. 8 is a fragmentary perspective view of the preferred embodiment of the apparatus of the present invention.
Figure 9:
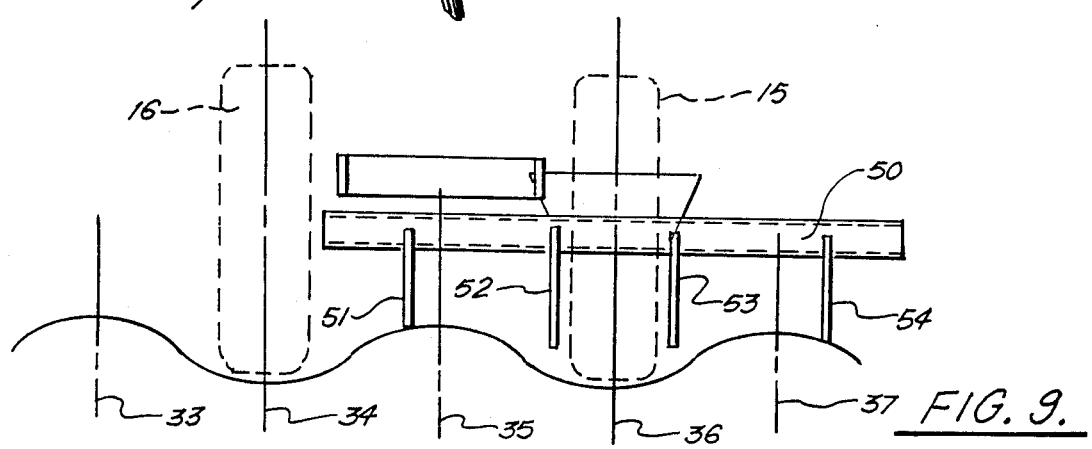
FIG. 9 is a front schematic fragmentary view of the preferred embodiment of the apparatus of the present invention illustrating placement of the loader wheels and cane engaging tines.

In FIGS. 7 and 8, the grapple is shown as connected to the end portion 41 of boom 24. The grapple is comprised of a pair of jaws 45, 46 mounted to pivot at 49 and operated for example with hydraulic cylinders 48 to open and close along a jaw travel path 43 which is skewed with respect to the longitudinal axis 42 of boom 24 (see FIGS. 5-6 and 8). FIG. 7 shows the jaws 45, 46 in both open and closed positions. This arrangement allows the boom to be moved through a very small arc of travel of for example ninety degrees (90°). It allows the boom to be made smaller and increases visibility for the operator 14. As can be seen in FIGS. 5 and 6, the pivot 40 is preferably offset from the centerline 12 C of the frame but the skewed orientation of the grapple with respect to the boom axis as afore described allows the canestalk C to be grabbed at a position which spaces the canestalks well away from the cane cart 25 and its hauling tractor T. The skewed arrangement also allows the canestalks to be oriented longitudinally with respect to the longitudinal axis 25 X of the cane cart. Thus, the fixed skewed arrangement of the grapple with respect to the boom affords advantages over the prior art including better visibility for the operator, reduced boom length which reduces the swinging mass. Further, the piled cane can be located to the left hand side of the loader centerline with loading to the right-hand side of the loader. This moves the ends of the cane heap row/pile away from the furrow that the tractor and cane carts are running in. This positioning eliminates roll over and damage to the ends of the cane and eliminates dirtying of the cane which can be caused by the splashing of mud when the tractor and cane cart are running in a common furrow with their adjacent wheels.

We claim:

1. A wholestalk sugar cane loader apparatus for picking up and accumulating windrowed wholestalks from a cane field ground surface having heap rows and furrows comprising:
   (a) a wheeled movable carriage adapted to travel along a path defined by the carriage longitudinal center axis, generally parallel to the longitudinally extending elongated heap rows with the carriage wheels trailing in parallel furrows;
   (b) means, positioned adjacent the carriage for movement therewith during gathering of windrowed wholestalk cane, for accumulating wholestalk cut cane from a resting position on the cane field ground surface into a heap;
   (c) an elongated boom pivotally mounted at a rotary connection to the carriage and extending away from the rotary connection along a radial line defining a boom longitudinal axis;
   (d) a pair of opposed jaws, attached to a distal end portion of the boom opposite the rotary connection, the jaws being movable with respect to each other along a jaw travel path, the jaw travel path and the boom longitudinal axis being fixed during operation to intersect each other defining an acute angle therebetween.

2. The loader apparatus of claim 1 wherein the boom has a length sufficient to position the grapple forward of the carriage and left of the carriage so that cut fallen cane stalks can be grasped by the grapple forwardly and to the left of the carriage.

3. The apparatus of claim 1 wherein the carriage has a longitudinal axis and the rotary connection is offset laterally from the carriage longitudinal axis.

4. The apparatus of claim 3 wherein the defined acute angle places the jaw travel path parallel to the carriage longitudinal axis when the boom rotates the jaws to a position forwardly of the carriage, left of the carriage centerline, and wherein the boom defines an acute angle with the carriage longitudinal axis.

5. The loader apparatus of claim 1 wherein the boom travels between "pick-up" and "discharge" position during use which respectively positions the grapple forward of the carriage and left of the vehicle center axis in the "pick-up" position when gathering cut cane wholestalks, and to the right of the carriage centerline in the "discharge" position at the cane cart.

6. The apparatus of claim 5 the cane stalks are placed in a generally aligned position with respect to one another during transfer of the cane stalks between "pick-up" and "discharge" positions.

7. The apparatus of claim 1 wherein the carriage has four wheels, and the wheelbase is one row wide so that the left and right wheels can occupy adjacent furrows.

8. The loader apparatus of claim 1 wherein the carriage has four wheels and the wheelbase is two rows wide.

9. The loader apparatus of claim 1 wherein the carriage has three wheels.

10. The loader apparatus of claim 9 wherein the loader has larger front wheels and a single rear wheel.

11. The loader apparatus of claim 1 further comprising endless chain pick-up means for transferring cut cane wholestalks upwardly with respect to the ground surface and elevated holding means for accumulating cane that is lifted by the chain pick-up means in a position above the cane field ground surface.

* * * * *